Oct. 9, 1945.    J. J. CAMPODONICO    2,386,540
MULTISPEED GEAR TRANSMISSION
Filed Sept. 17, 1943    4 Sheets-Sheet 1
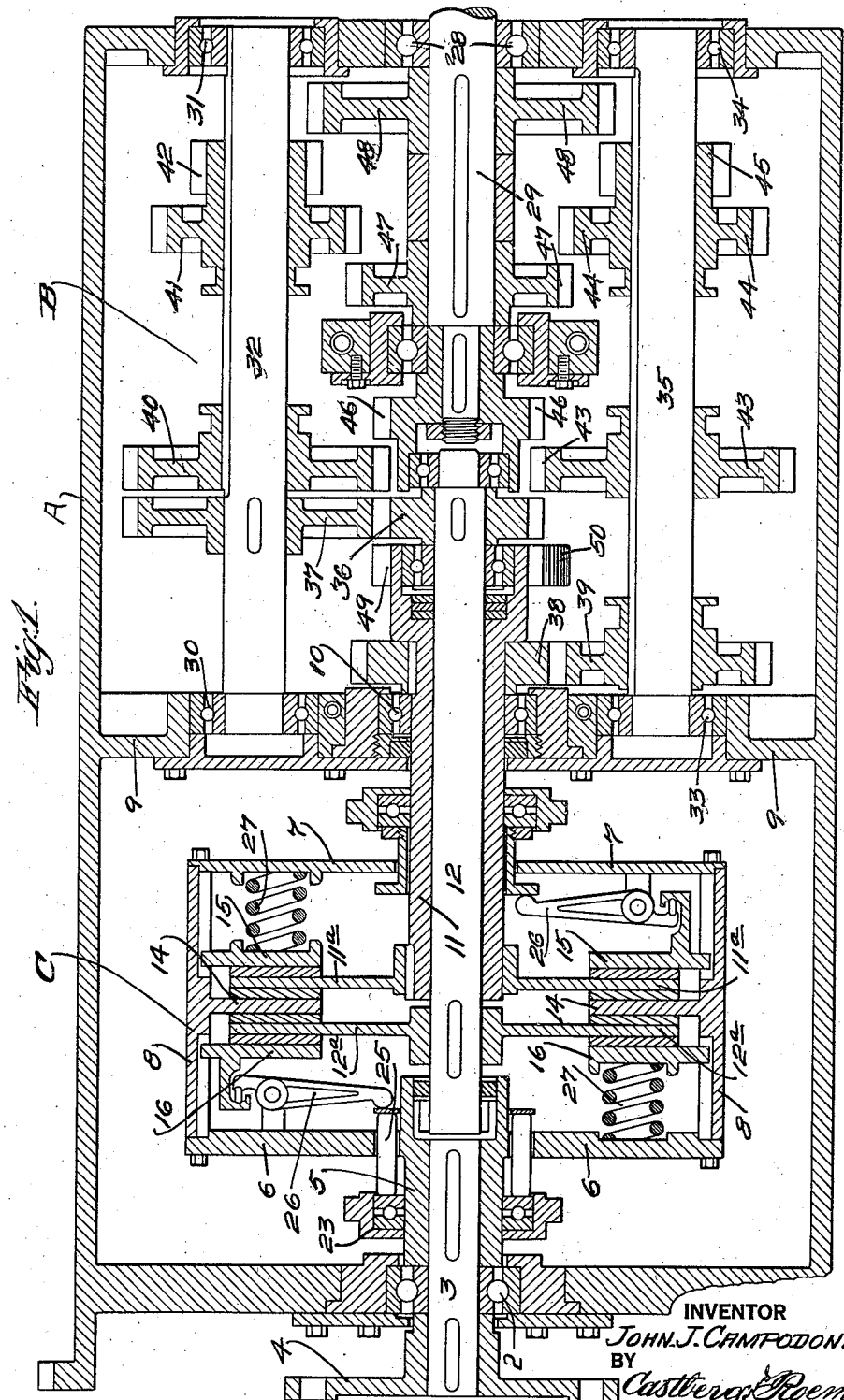
INVENTOR
John J. Campodonico.
BY
Castberg & Roemer
ATTORNEYS.

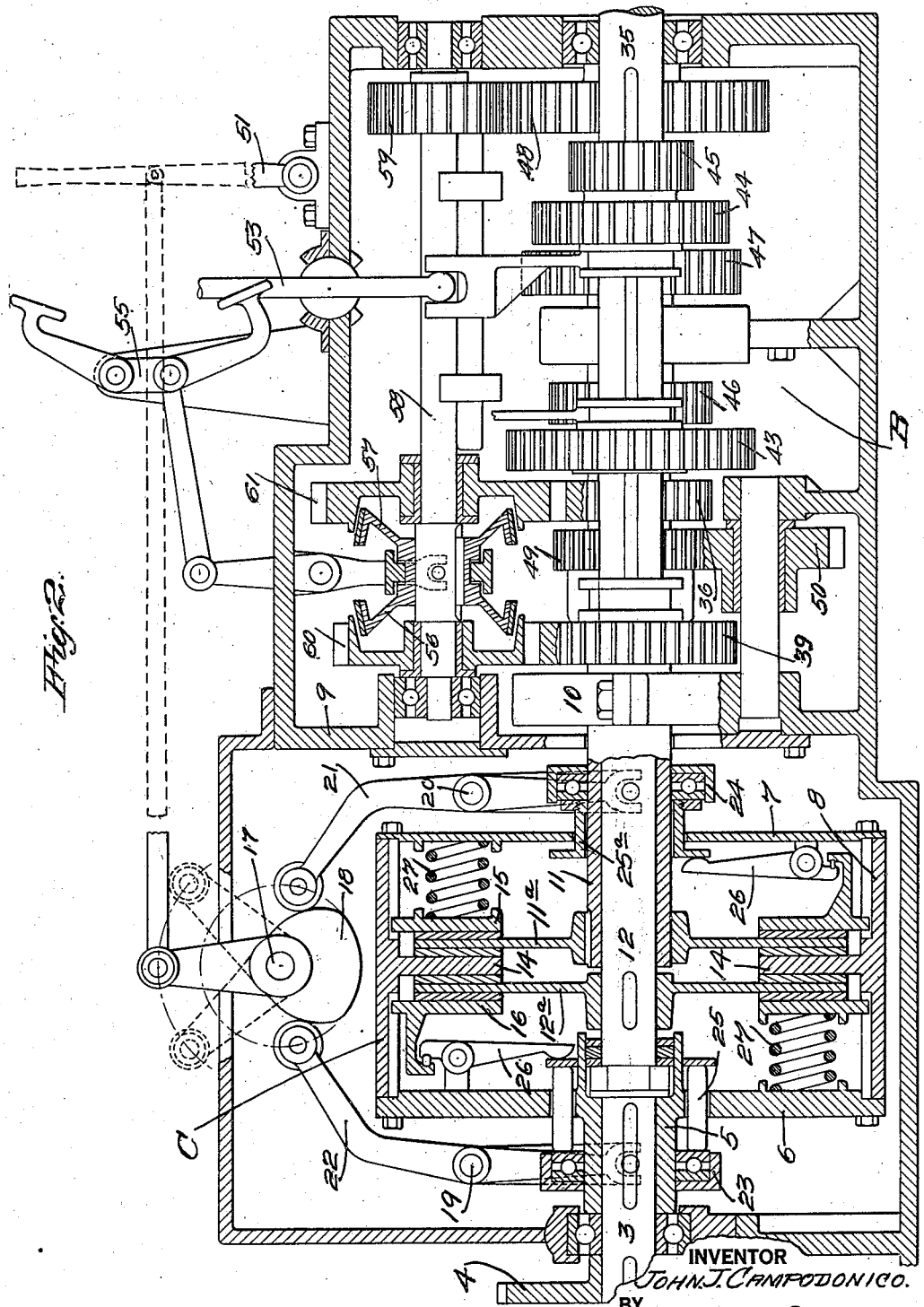

Oct. 9, 1945.   J. J. CAMPODONICO   2,386,540
MULTISPEED GEAR TRANSMISSION
Filed Sept. 17, 1943   4 Sheets-Sheet 3
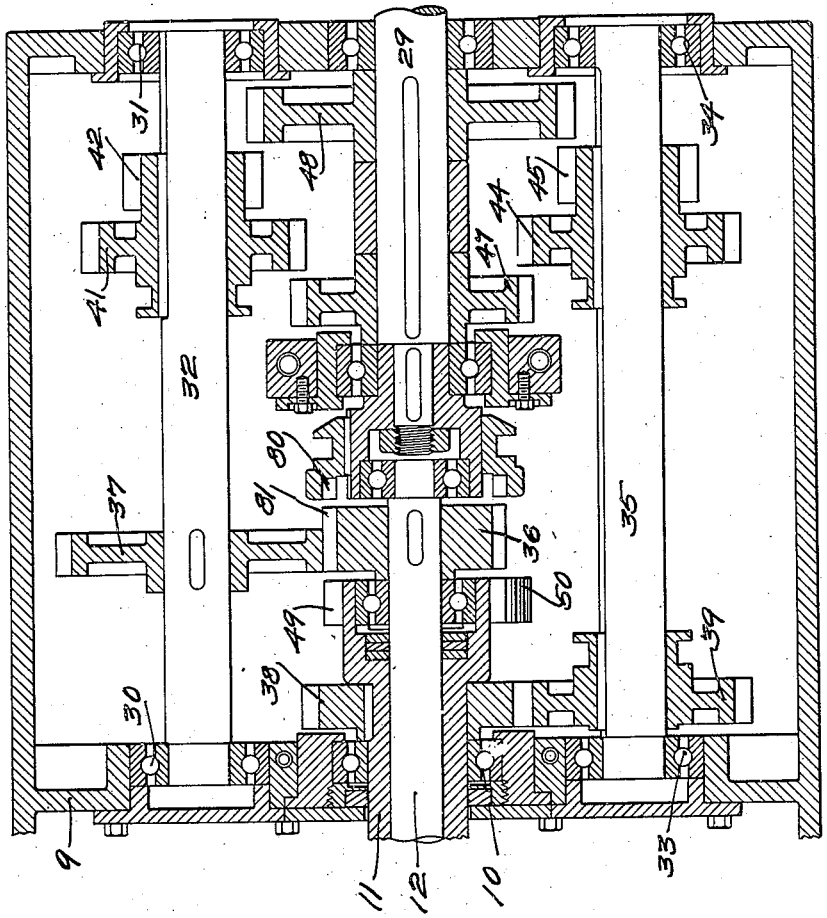
INVENTOR
JOHN J. CAMPODONICO.
BY
Castberg Roemer
ATTORNEYS.

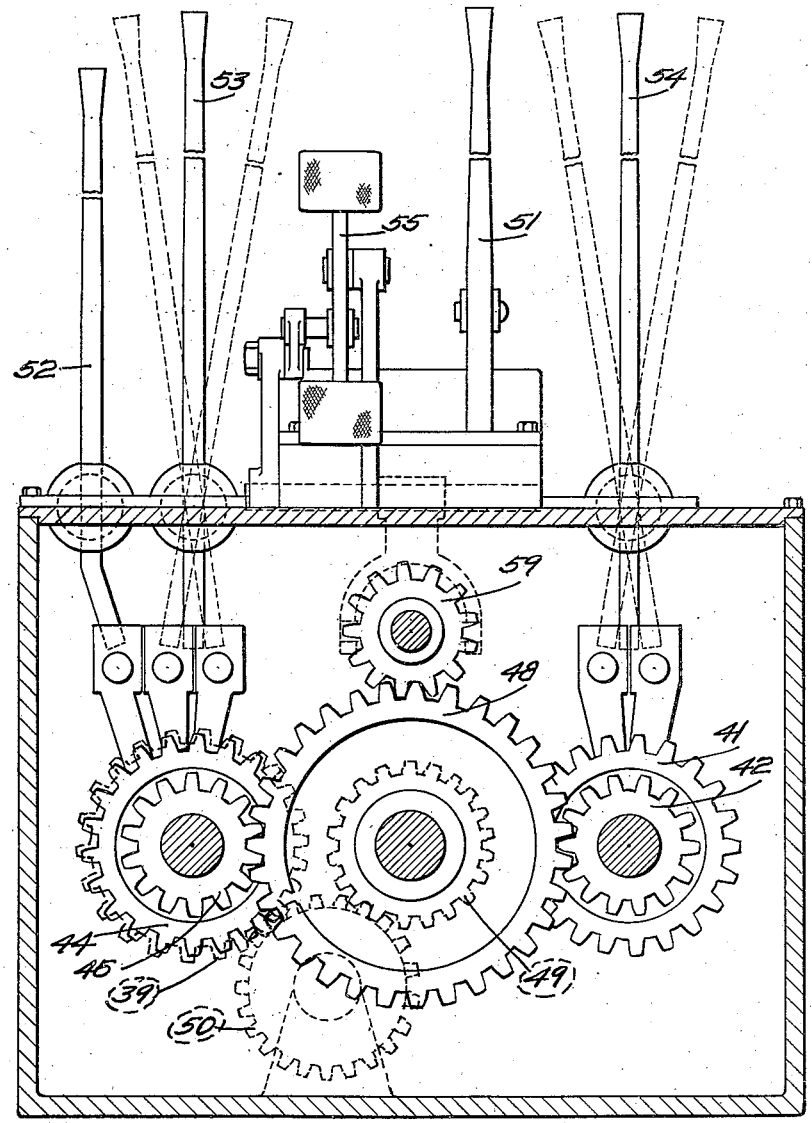

Patented Oct. 9, 1945

2,386,540

UNITED STATES PATENT OFFICE 2,386,540

MULTISPEED GEAR TRANSMISSION

John J. Campodonico, Stockton, Calif.

Application September 17, 1943, Serial No. 502,847

4 Claims. (Cl. 74—330)

This invention relates to a multi-speed gear transmission, and especially to a transmission which is adapted to heavy duty work as in tractors, tanks, trucks, and the like.

The object of the present invention is generally to improve and simplify the construction and operation of transmissions of the character described; to provide a multi-speed gear transmission which is provided with two countershafts to which power is selectively transmitted either to one or the other and from either of which power is transmitted to a common driven or propeller shaft at different speeds; to provide means for reversing one of the countershafts so that power may be transmitted to the driven shaft both ahead and reverse; to provide means for spinning either countershaft so that shifting of gears when changing from one speed to another may be accomplished without clashing of gears; to provide a transmission in which it is possible while driving, for instance in low or first speed, to change or mesh the gears of second speed and then by clutch action to transfer the drive from low to second without noticeable loss of either inertia or momentum; to provide a transmission in which it is possible to have two sets of driving gears of different ratio in mesh while transmitting power through one set; and further, to provide a transmission in which it is possible to have two sets of gears in mesh, one for ahead drive, and one for reverse and by clutch actuated means selectively to transmit the drive through either.

The invention is shown by way of illustration in the accompanying drawings, in which:

Fig. 1 is a horizontal longitudinal section of the transmission taken on line I—I of Fig. 2;

Fig. 2 is a vertical longitudinal section taken on line II—II of Fig. 1, said view showing the spinning clutches in section;

Fig. 3 is a section similar to Fig. 1, but showing a modification whereby a direct drive may be obtained; the clutch mechanism is not shown in this view;

Fig. 4 is an end view in section, said section being taken on line IV—IV of Fig. 2.

Referring to the drawings in detail, and particularly Fig. 1, A indicates a case or housing, in one end of which is mounted a multiple speed gear transmission unit, generally indicated at B, and in the opposite end of which is mounted a compound clutch unit, generally indicated at C. Journaled as at 2, adjacent the clutch unit, is a shaft 3, one end of said shaft having a coupling 4, whereby it is connected with an engine or any other suitable motive power. On the opposite end is secured a hub 5, and forming a part of said hub and driven by the hub is a clutch housing, consisting of end plates 6 and 7 and an intermediate housing 8.

Formed between the clutch unit and the gear transmission unit is a partition or cross wall 9 and journaled therein as at 10 is a sleeve shaft 11, and within the same a shaft 12. The sleeve 11 carries a clutch member 11a and the shaft 12 carries a clutch member 12a. These clutches are in the form of plates and they cooperate with a central plate 14 forming a part of the housing 8 and with a pair of sliding plates 15 and 16. Mounted above the clutch unit and interiorally of the housing A is a shaft 17, on which is formed a cam 18. Pivotally mounted at opposite ends of the clutch unit, as at 19 and 20, are a pair of clutch actuating arms 21 and 22. Their upper ends are provided with rollers which engage the cam 18, while their lower ends are forked to straddle a pair of slideably mounted thrust collars 23 and 24. These collars through pins 25 and a sleeve 25a actuate levers 26, pivoted within the clutch unit, and as the levers 26 are connected with clutch plates 15 and 16, it can be seen that when the cam is swung in one direction, one or another of the clutch plates 15 or 16 will be disengaged, while one or another of said plates will be engaged by means of a helical compression spring 27. Thus, if power is transmitted through the coupling 4 to shaft 3, said shaft will cause rotation of the clutch unit or the housing 8 and the plate 14. If the cam 18 assumes the position shown in Fig. 2, both clutch members 11a and 12a will remain idle, as the cooperating plates 15 and 16 are held out of contact. On the other hand, if the cam 18 is swung towards the right, it will swing the clutch arm 21 to the right, thereby further disengaging the clutch 11a. At the same time the clutch arm 22 will also swing to the right, thereby permitting the helical springs 27 to cause engagement of the clutch plate 16 with the clutch member 12a and plate 14, thus transmitting power to the shaft 12. Conversely, by swinging the cam 18 in the left hand direction, clutch members 12a and 16 will be disengaged and the clutch members 11a and 15 will be engaged and power will then be transmitted to the sleeve shaft 11. Thus, the clutch unit may transmit power to either of the shafts 11 or 12 or it may assume a neutral position with relation to said shafts. The shafts 11 and 12 will hereinafter be referred to as drive shafts.

The drive shafts 11 and 12, as previously stated, are journaled in one end of the gear transmission unit, as indicated at 10. Journaled in the opposite end of this unit in the bearing 28 and in alignment with the shaft 12 is a driven or propeller shaft 29. Journaled as at 30 and 31 at one side of the shafts 12 and 29 is a countershaft 32, and similarly journaled in bearings 33 and 34 on the opposite side of the shafts 12 and 29 is a countershaft 35. The countershaft 32 is driven from the drive shaft 12 through gears 36 and 37 and the countershaft 35 is driven from the drive shaft, or the sleeve shaft 11, through gears 38 and 39. Splined and slidably mounted on countershaft 32 is a gear 40 and similarly mounted on the same countershaft are a pair of gears 41 and 42. Splined and slidably mounted on countershaft 35 is a single gear 43 and similarly mounted on the same shaft is a pair of gears 44 and 45. Secured on the driven or propeller shaft are three gears and these are indicated at 46, 47 and 48.

It was previously stated that the countershaft 32 was driven from the shaft 12 through gears 36 and 37 and that the countershaft 35 was driven from the shaft or sleeve 11 through gears 38 and 39. The gear ratio between gears 36 and 37 is lower than the gear ratio between the gears 38 and 39; hence, the countershaft 32 will be driven at a lower speed than the countershaft 35, and for this reason shaft 32 will be referred to as the low speed countershaft, while the shaft 35 will be referred to as the high speed countershaft. It should also be noted that the gears 42 and 45 are identical in size and so are the gears 41 and 44 and obviously their number of teeth and pitch will be identical. In view thereof, it is possible to mesh gear 42 with gear 48 and to mesh gear 45 with gear 48. Similarly, it is possible to mesh gear 41 with gear 47 and gear 44 with gear 47. When the gears 42 and 48 are meshed we have first, or low, speed; when the gears 45 and 48 mesh we have second speed; when the gears 41 and 47 mesh, we have third speed; when gears 44 and 47 mesh, we have the fourth speed; when gears 40 and 46 mesh, we have the fifth speed; and, when gears 43 and 46 mesh, we have the sixth, or high speed. It should also be noted at this point that gears 40 and 43 are of identical size and have the same number of teeth and pitch but they will obviously transmit different speeds to the gear 46 and the driven shaft 29, as one countershaft is driven at a higher speed than the other and it is for the same reason that different speeds are obtained when the gears 42 and 45 mesh with gear 48 and the same is true when gears 41 and 42 mesh with gear 47.

The transmission contains two more gears, to-wit: the gear indicated at 49 and an idler gear 50. Gear 49 is secured on the drive or sleeve shaft 11 in the same manner as the gear 38. It is in constant mesh with the idler gear 50. Gear 39 is splined and slidably mounted on countershaft 35 and as such may mesh either with the gear 38 or the idler 50 when the driven or propeller shaft is to be reversed.

The clutch unit C is controlled by a single clutch lever indicated at 51. This lever, when vertically disposed, maintains the clutches in neutral. When thrown forward or to the left, clutch 11a is released and clutch 12a engaged. Conversely, when thrown from vertical or central position to the right, clutch 12a is disengaged and clutch 11a engaged. There is a single reverse gear lever and that is indicated at 52 (see Fig. 4 of the drawings). This lever serves only two functions, to-wit: that of moving the gear 39 into driving position, as shown in Fig. 1, or into reverse position, that is into mesh with the idler 50. There are two additional gear shift levers, one for each countershaft. One of said levers is indicated at 53 and the other at 54. The lever 53 controls shifting of gears 43, 44 and 45 on the countershaft 35 and the lever 54 controls shifting of the gears 40, 41 and 42 on the countershaft 32. There is only one additional lever and that is indicated at 55. This is a foot actuated double pedal and it controls the position of a synchronizing clutch which has two clutch faces, indicated at 56 and 57. This clutch is splined and slidably mounted on a shaft 58, which is continuously driven from the gear 49 by the gear 59. Two gears are mounted on the shaft 58 and these are indicated at 60 and 61. The gear 60 meshes with the gear 38, secured on the drive shaft 11, while the gear 61 meshes with the gear 36, secured on the drive shaft 12. By rocking the foot pedal 55 in one direction, the clutch face 56 will be thrown into engagement with a cooperating clutch face formed on gear 60. It will thus spin the gears 60 and 38 and countershaft 35. The spinning of the countershafts for the purpose of bringing the gears to a speed where they can mesh without clash is in itself old, but it is nevertheless utilized in this instance when certain gear shifts hereinafter to be described are to be made.

In actual operation it will be noted that low, third and fifth speed drives are obtained from the countershaft 32 and that second, fourth and sixth speed drives and reverse are obtained from countershaft 35. Similarly, when in reverse, three speeds are possible, to wit, second, fourth and sixth. If the transmission is mounted in a tractor and the tractor is standing still, the gear shift lever 54 is moved to bring the low or number one gear drive into mesh; that is, gears 42 and 48. Then by moving the clutch lever to engage the clutch plates 12a and 16, power will be transmitted through the shafts 3 and 12 and the gears 36 and 37 to countershaft 32 and finally through gears 42 and 48 power is transmitted to the driven or propeller shaft 29. If the tractor is hauling a dead load like a gang of ploughs, it is possible when sliding the gears 42 and 48 into mesh also to slide the gear 45 into mesh with gear 48, while the clutches are still in neutral. When the gears 42 and 45 are meshing with the gear 48, the clutch members 12a and 16 may be engaged and power will, as has previously been stated, be transmitted through countershaft 32 and gears 42 and 48 to the driven or propeller shaft 29. Under that condition gear 48 will also spin the gear 45 and the countershaft 35 and hence gears 39 and 38 and the sleeve shaft 11. Such spinning action may take place as the clutch members 11a and 15 are disengaged; however, if the operator desires to shift to second gear, he merely moves the clutch lever to disengage the clutch members 12a and 16 and to engage the clutch members 11a and 15. When he does so, power will be transmitted through the sleeve shaft 11 and the gears 38 and 39 to countershaft 35, and then through gears 45 and 48 power will be transmitted to the driven or propeller shaft 29. Thus, when changing from low to second, the shift is accomplished in the wink of an eye, as all the operator has to do is to throw the clutch lever from one position to another, thereby making the shift from one gear ratio to another without losing either time or momentum. Furthermore, when shifting from low to second, it must be remembered that the sleeve shaft 11 together with its clutch member 11a are spinning; hence, when the clutch member 11a engages the cooperating clutch member 15, such engagement is made without loss of momentum, due to the spinning action of the countershaft 35, gears 38 and 39 and shaft 11 together with its clutch 11a.

When shifting from second speed to third, gears 41 and 47 must be meshed and they cannot be meshed without clashing without resorting to the use of the synchronizing clutch, hence, while driving in second the operator can take his time to kick in the synchronizing clutch so as to spin or bring the countershaft 32 up to a speed where the gears 41 and 47 can be thrown into mesh without clashing and when they are meshed, the operator can again take his time, as when he wants to shift from second to third, the gears in third are already in mesh and all the operator has to do is to throw the clutch lever from one position to another and as this is accomplished, as previously stated, in the wink of an eye, again a shift is made without loss of time or momentum. The operation in shifting from third to fourth speed, or from fourth to fifth, or from fifth to sixth is the same; that is, whichever countershaft is to serve as the driver must be spun by the synchronizing clutch until a selected gear ratio is meshed and when it is meshed, the main driving clutches are merely reversed by the clutch lever to transfer the drive from one countershaft to the other. It is also possible when using this type of transmission to shift directly from low to high, or sixth, speed, as the synchronizing clutch will permit the countershaft 35 to be spun at such a speed that while driving through the low gears 42 and 48, gears 43 and 46 may be meshed by the synchronizer without clashing. Conversely, it is possible to step down from a higher gear ratio to a lower gear ratio by using the synchronizing clutches.

The transmission here shown, while adapted for tractors, tanks, trucks and the like, is also especially adapted for use on a bulldozer or like implement. The operation of a bulldozer usually consists of going ahead in low gear; that is, when shoving a load or digging into a bank or the like, followed by backing up, picking up to pick up a new load, or to take a new bite. For instance, the operator of the bulldozer may be shoving heavy loads in a forward direction and in that instance would use the lowest gear ratio through the gears 42 and 48. For backing up he would move gear 39 into mesh with the reversing idler and he could use any one of the speeds 2, 4 or 6 during the reversing operation. For instance, if he wanted to use the second speed through gears 45 and 48 he would have these in mesh; hence, in going ahead he would be driving through the clutch members 12a and 16 to transmit power to the countershaft 32 and through gears 42 and 48 would drive the driven or propeller shaft 29 to go ahead, and as the second speed or gears 45 and 48 are in mesh and the reverse gears are in mesh all he has to do when backing up is to throw his clutch lever from one position to another, so as to disengage the clutch members 12a and 16 and engage the clutch members 11a and 15. Again, when he wants to go ahead when gears 42 and 48 are in mesh he only has one operation to perform, and that is, to throw the clutch lever from the last position to the previous position, that is, disengage the clutches 11a and 15 and engage the clutches 12a and 16. In other words, he can go ahead or reverse without shifting gears and he does it without any loss of time, as the only operation necessary is to switch from one clutch to another by means of the clutch lever. If second speed is too slow when reversing, he may use the fourth speed, or the sixth speed, as he has a choice of second, fourth, and sixth when reversing and any one of these gears may remain in mesh while he is going ahead in low or third, or whatever speed ahead he selects.

In Fig. 3 a slight modification is shown. In this transmission there are two speeds in reverse and five ahead, that is the number of speeds which may be transmitted from the two counter shafts has been reduced to four in place of six as in the structure shown in Fig. 1, but in place of the fifth and sixth gear drives a direct drive is provided. This is accomplished by placing a sliding jaw clutch 80 on the inner end of the driven shaft which may be shifted into engagement with complementary jaws 81 formed at the end of gear 36. The jaw clutch may be actuated by either of the shifting levers and when engaged permits a direct drive to be transmitted through the drive shaft 12 and while this and other features of the present invention have been more or less specifically illustrated, I wish it understood that various changes in form and proportion may be resorted to within the scope of the appended claims, and that the materials and finish of the several parts employed may be such as the experienced and judgment of the manufacturer may dictate or varying uses may demand.

Having thus described my invention, what I claim and desire to secure by Letters Patent is:

1. In a transmission of the character described, a housing, a pair of counter shafts and a driven shaft journaled in the housing, a plurality of gears on the driven shaft, a plurality of gears on each counter shaft, means for reversing one countershaft, means for meshing a gear on one countershaft with a gear on the driven shaft, means for meshing a gear of another speed ratio on the countershaft which is reversible with another gear on the driven shaft, and means for transmitting motive power to either countershaft to drive the driven shaft ahead at one speed or reverse at another speed.

2. In a transmission of the character described, a pair of driving shafts, a pair of countershafts driven one by each drive shaft, a driven shaft, a plurality of gears secured on the driven shaft, a plurality of gears on each countershaft selectively movable to mesh the gears on the driven shaft to drive the driven shaft at different speeds, means for selectively transmitting power to drive either drive shaft, and means for reversing one of the counter shafts.

3. A transmission of the character described, comprising a housing, a pair of drive shafts journaled therein, a pair of countershafts also journaled in the housing, a pair of gears connecting one drive and one countershaft to drive said countershaft, a reverse driving and a direct driving gear on the other drive shaft, a reverse gear meshing the reverse driving gear, a gear slidably mounted on the other countershaft and adapted to selectively mesh either with the reverse or with the direct driving gear to drive the other countershaft either ahead or reverse, means for selectively transmitting power at different speeds, either ahead or reverse from said other countershaft to the driven shaft, and means for selectively transmitting power at different speeds ahead from the first named countershaft to the driven shaft.

4. A transmission of the character described, comprising a housing, a pair of drive shafts journaled therein, a low and a high speed countershaft also journaled in the housing, one countershaft being driven by one drive shaft and the other countershaft by the other drive shaft, clutch actuated means for selectively driving either drive shaft and connected countershaft, a driven shaft journaled in the housing, a first and a second gear secured on the driven shaft, a pair of gears of identical size and pitch, splined and slidably mounted, one on each countershaft, means for selectively meshing either of said gears with the first gear of the driven shaft, a second pair of gears of identical size and pitch, splined and slidably mounted, one on each countershaft, means for selectively meshing either of said gears with the second gear on the driven shaft, and means for transmitting a reverse drive to one of the countershafts.

JOHN J. CAMPODONICO.